United States Patent [19]

Sasaki

[11] Patent Number: 5,761,704
[45] Date of Patent: Jun. 2, 1998

[54] APPARATUS FOR COPYING DISK

[75] Inventor: Takamasa Sasaki, Kawasaki, Japan

[73] Assignee: Fujitsu Limited, Kawasaki, Japan

[21] Appl. No.: 782,838

[22] Filed: Jan. 13, 1997

Related U.S. Application Data

[63] Continuation of Ser. No. 277,617, Jul. 20, 1994, abandoned.

[30] Foreign Application Priority Data

Sep. 17, 1993 [JP] Japan ................................ 5-231277

[51] Int. Cl.$^6$ ............................................. G06F 9/40
[52] U.S. Cl. ............................................. 711/111; 360/48
[58] Field of Search ................................ 395/701, 680, 395/681, 182.03, 182.04; 360/48, 78.13; 711/114, 111, 112

[56] References Cited

U.S. PATENT DOCUMENTS

| | | | |
|---|---|---|---|
| 4,413,317 | 11/1983 | Swenson | 711/114 |
| 4,797,810 | 1/1989 | McEntee et al. | 707/206 |
| 5,089,958 | 2/1992 | Horton et al. | 395/182.03 |
| 5,155,835 | 10/1992 | Belsan | 711/114 |
| 5,210,866 | 5/1993 | Milligan et al. | 395/182.04 |
| 5,278,838 | 1/1994 | Ng et al. | 395/182.04 |
| 5,333,303 | 7/1994 | Mohan | 395/182.18 |
| 5,367,669 | 11/1994 | Holland et al. | 395/182.05 |
| 5,392,415 | 2/1995 | Badovinatz et al. | 711/6 |
| 5,421,003 | 5/1995 | Escola et al. | 395/182.14 |

FOREIGN PATENT DOCUMENTS

| | | |
|---|---|---|
| 330033 | 2/1991 | Japan . |
| 03-144721 | 6/1991 | Japan ............................ G06F 3/06 |
| 3144721 | 6/1991 | Japan . |

*Primary Examiner*—Lucien U. Toplu
*Assistant Examiner*—St. John Courtenay, III
*Attorney, Agent, or Firm*—Greer, Burns & Crain, Ltd.

[57] ABSTRACT

A data processing apparatus is constructed of a plurality of processors constituting a multiprocessor and couples of dual disk devices. One specific processor among the plurality of processors includes a copy executing section. All the processors are provided with data processing sections for issuing I/O write requests to the disk devices and managing sections for setting exclusive environments in some of the disk devices in accordance with indications of the copy executing sections. The copy executing section, after causing the managing section of each processor to set the exclusive area in a specific area of the disk device, effects the copy processing between the disk devices with respect to this area. When issuing the I/O write request having a high degree of importance for this exclusive area from the data processing section, however, the processing to this I/O write request is immediately executed, and, thereafter, exclusive area resetting relative to this exclusive area is carried out.

17 Claims, 9 Drawing Sheets

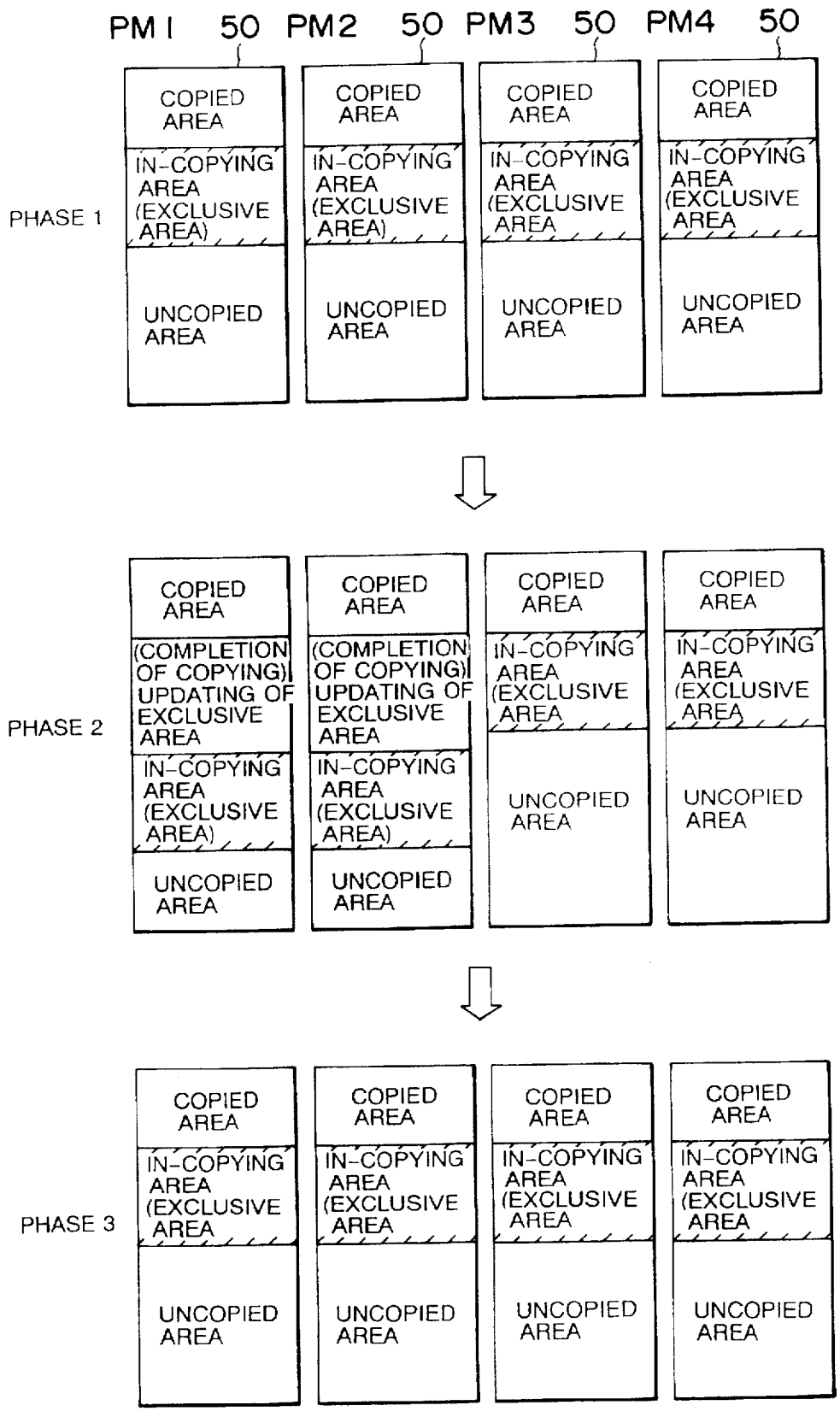

APPARATUS FOR COPYING DISK

This application is a continuation of application(s) Ser. No. 08/277,617 filed on Jul. 20, 1994, now abandoned.

BACKGROUND OF THE INVENTION

1. Field of the Invention

The present invention relates generally to a disk copying apparatus for copying contents of one disk to another disk to actualize a dual disk system incorporated into a computer system. The present invention relates more particularly to a disk copying apparatus capable of assuring effective data processing when copying the contents of one disk on the other disk.

2. Description of Related Art

With a spread of an applied field of a computer system in recent years, it has become increasingly desirable to have a computer systems, exhibiting a high degree of reliability, capable of continuously performing services even in the event of a hardware malfunction. Accordingly conventional computer systems have adopted a dual disk system of architecture. Based on this architecture, the same items of data are stored in both of the dual disks. Accordingly, even if a malfunction occurs in any one of the disks, the data stored in that disk is not lost from the computer system as a whole.

In the computer system taking the dual disk system, if one disk becomes unusable due to an occurrence of some trouble in the disk during a system operation, the dual disk system becomes a single disk system in which only the other disk is employed. In this case, it is required that the disk undergoing the occurrence of trouble be replaced with a new disk in order to maintain the high reliability. It is therefore necessary to resume operation of the dual disk system. Note that this whole process is done desirably without stopping the system. For this purpose, the computer system taking the dual disk system executes such processing that contents of the dual disks are identical once again by copying the contents of the in-operation disk onto the newly exchanged disk. This processing is hereinafter termed "dualizing". The above-described disk dualizing is required to be executed without decreasing a data processing efficiency.

Dualizing involves avoiding execution of "normal write processing" at an in-copying area to avoid a conflict with I/O write processing for copying. This is necessary because the contents of the two disks would not coincide with each other, if the above "normal write processing" is permitted. This "normal write processing" is exemplified as I/O write processing for paging.

For this reason, when performing the disk dualizing, the conventional copying apparatus sets a now-in-copying storage area which reserves corresponding storage areas of each of the disks, as an exclusive area in order to avoid the conflict with the I/O write processing. Then, if there is an I/O write request issued for this exclusive area, this I/O write request is linked to a queue, and an execution thereof is suspended. The execution of the I/O write request linked to this queue is permitted for the first time after completing the copying.

There arise, however, the following drawbacks induced when adopting the architecture described above. That is, there exists a case where the I/O write request for paging is relative to paging about the data needed for a continuation of the dualizing. Exemplifying the data necessary for this dualizing, there are given items of data for specifying the exclusive area, data about an executing environment of the write processing and data about an processing environment for processor-to-processor communications. These items of data are required for moving the exclusive area, i.e., the in-copying storage area. Accordingly, these items of data have to undergo the page-in on a main memory for the processors constituting the computer system in order to move the exclusive area, i.e., the in-copying storage area. The I/O write request for this paging is, however, linked to the queue, and hence the paging is not executed unless the in-copying storage area is moved. Therefore,the I/O write processing for the paging and the moving process of the in-copying storage area are stopped because of waiting for the completion of the processing each other, resulting in a deadlock state. Further, in other cases also, a drawback is produced, wherein the processing having a high degree of importance is waited, if the write request linked to the queue exhibits a high degree of importance (for example, even if the deadlock is not caused).

Note that there exists a computer system architecture in which a special file such as an external storage file, for the paging is developed on a single-component disk prepared separately from the dual disks. This architecture, however, involves a problem that the dualizing can not be done with respect to this special file, and therefore the utilizability is poor.

SUMMARY OF THE INVENTION

The present invention, is based on the premise of a dual disk system in which one of the disks has failed and has been replaced, making it necessary to dualize, i.e. to copy data from one disk to the replaced disk, while setting an exclusive environment to execute dualizing of these disks. The present invention therefore aims at actualizing a disk copying apparatus capable of executing the disk-to-disk copy processing while assuring efficient data processing in which a deadlock inherent in an I/O write request for paging is prevented and in which a delay of an execution of the I/O write processing having a high degree of importance to the system is prevented.

The disk copying apparatus according to the present invention is a disk copying apparatus in a data processing system for performing write processing to a plurality of disk devices for storing data. This disk copying apparatus comprises a copy executing element for executing copy processing to copy data stored in one disk device onto the other disk device. The disk copying apparatus also comprises a determining element for determining, when the write request occurs during the copy processing by the copy executing element, whether or not this write request makes a request for predetermined specified write processing. The disk copying apparatus further comprises a forced execution element for forcibly executing, when the determining element determines that the write request occurred makes the request for the predetermined specified write processing, write processing corresponding to the write request. The disk copying apparatus still further comprises a re-executing element for causing the copy executing element to effect the copy processing over again when the forced execution element forcibly executes the write processing, and a suspending element for suspending, when the determining element determines that the write request occurred does not make the request for the predetermined specified write processing, the write request till the copy executing element finishes the copy processing.

The disk copying apparatus according to the present invention may be constructed to further comprise a managing element for managing, as an exclusive area, an area in which the copy processing is performed by the copy executing element. Herein, the exclusive area implies an area to which the suspending element suspends, when write processing exclusive of the predetermined specified write processing is issued, an execution of the write processing. This suspending element may include a queue to which the write requests to be suspended are linked. In this case, preferably, after completing the copy processing by the disk copying apparatus, the corresponding write processing is executed to the write request linked to the queue.

Further, the disk copying apparatus according to the present invention may be constructed to execute the copy processing on the unit of storage area into which the disk device is subdivided. In this case, the following architecture may be taken. The copy executing element performs the copy processing by specifying only some of the storage areas of the disk device. The managing element manages some storage areas where the copy processing is effected as the above exclusive areas. In this architecture, preferably the managing element has a management table for indicating locations of the exclusive areas within the storage area. In this management table, it is possible to manage the data showing whether or not the forced execution element has forcibly executed the write processing to the exclusive area. In this case, the re-executing element is capable of recognizing the fact that the forced execution has been done on the basis of this item of data. In the case of thus subdividing the copying area, the architecture may include a detecting element for detecting whether or not the write request occurred is issued for the exclusive area managed by the managing element. This detecting element may preferably be constructed which causes the determining element to make a determination only when the write request is issued for the exclusive area, and which causes, if the write request is not for the exclusive area, to execute the corresponding write processing through no intermediary of the determination made by the determining element.

Further, the disk copying apparatus according to the present invention can be adopted in a multiprocessor system including a plurality of processors. In this case, one specific processor among the plurality of processors has the copy executing element and the re-executing element and all of the plurality of processors may include the determining elements and the forced execution elements. Then, the re-executing element may be constructed to cause the copy executing element to effect the copy processing over again even if one of the forced execution elements incorporated into the respective processors forcibly executes the write processing. Note that all the processors may be provided with the managing elements if the architecture includes the managing elements.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is an explanatory diagram showing a flow of processing when a write request having a high degree of importance occurs in the embodiment of this invention.

DESCRIPTION OF THE PREFERRED EMBODIMENT

Figure 1:
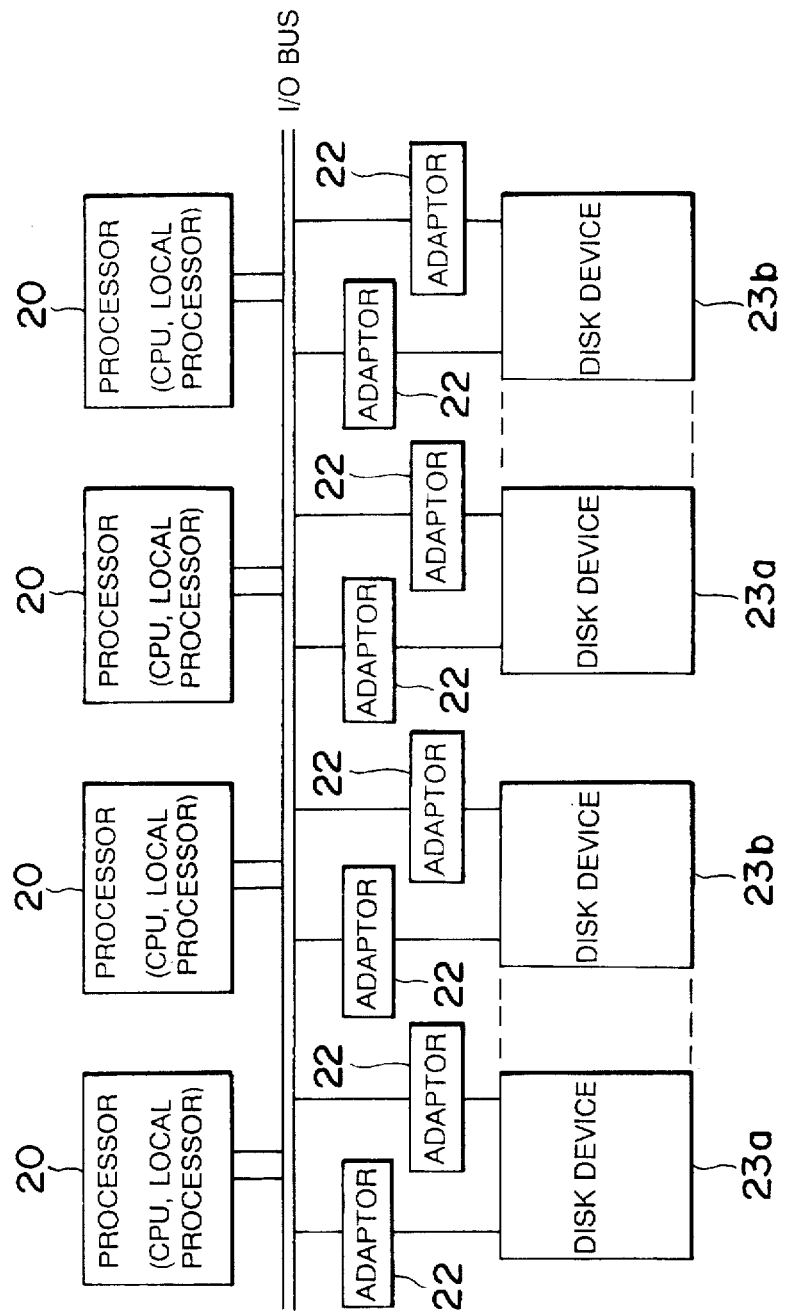
FIG. 1 is a block diagram illustrating a data processing system including a disk copying apparatus in accordance with an embodiment of the present invention.

FIG. 1 illustrates an architecture of a data processing system in accordance with an embodiment of the present invention.

As illustrated in FIG. 1, this data processing system adopts a multiprocessor architecture. Referring to FIG. 1, a plurality of processors 20 are connected to an I/O bus 21. Dual disk units 23 are connected via adapters 22 to this I/O bus.

Each processor 20 controls the whole data processing system. Especially, the respective processors 20 are capable of mutually independently executing I/O processing with respect to the individual disk units 23.

Each dual disk unit 23 is constructed of a couple of disk devices 23a and 23b having the same hardware architecture and the same storage data. Each of the disk devices 23a and 23b is connected to an I/O bus 21 via a couple of adapters 22 serving as I/O interfaces.

When constructed in this manner, I/O write processing (updating of the data or the like) to the dual disk unit 23 is executed by one of the processors 20 during a normal operation. In this case, absolutely the same processing is effected on both of the individual dual disk devices 23a and 23b. There is thus assured the identity of the storage data of the individual disk devices 23a and 23b constituting the dual disk unit 23.

Further, if a trouble happens in a one of the individual disk devices 23a and 23b constituting the dual disk unit 23, it is required to exchange the individual disk device 23a or 23b in which the troubles occur. In such a case, dualizing is executed. More specifically, it follows that the contents of the non-exchange exchanged disk device 23a or 23b are copied on newly installed disk device 23a or 23b during the operation of the system.

This embodiment takes such an architecture that a request having a higher degree of importance to the system among all of the I/O write requests to the disk unit 23 is not delayed on the occasion of executing this dualizing process. That is, if a write request unimportant to the system occurs in a memory area undergoing the copying process, this write request is suspended. (An environment where such suspending is carried out is termed an exclusive environment. A storage area in which this exclusive environment is set is referred to as an exclusive area.) In contrast with this, if a write request important to the system occurs in this exclusive area, this write request is not suspended but executed. The copying process of the identical exclusive area is again effected thereafter. This embodiment adopts the above architecture and thereby assures an equivalency of the dual disk units 23 and 24. Note that the term "copying process" used herein connotes a series of processing ranging from setting of the exclusive area to a completion of copying for this exclusive area.

Figure 2:
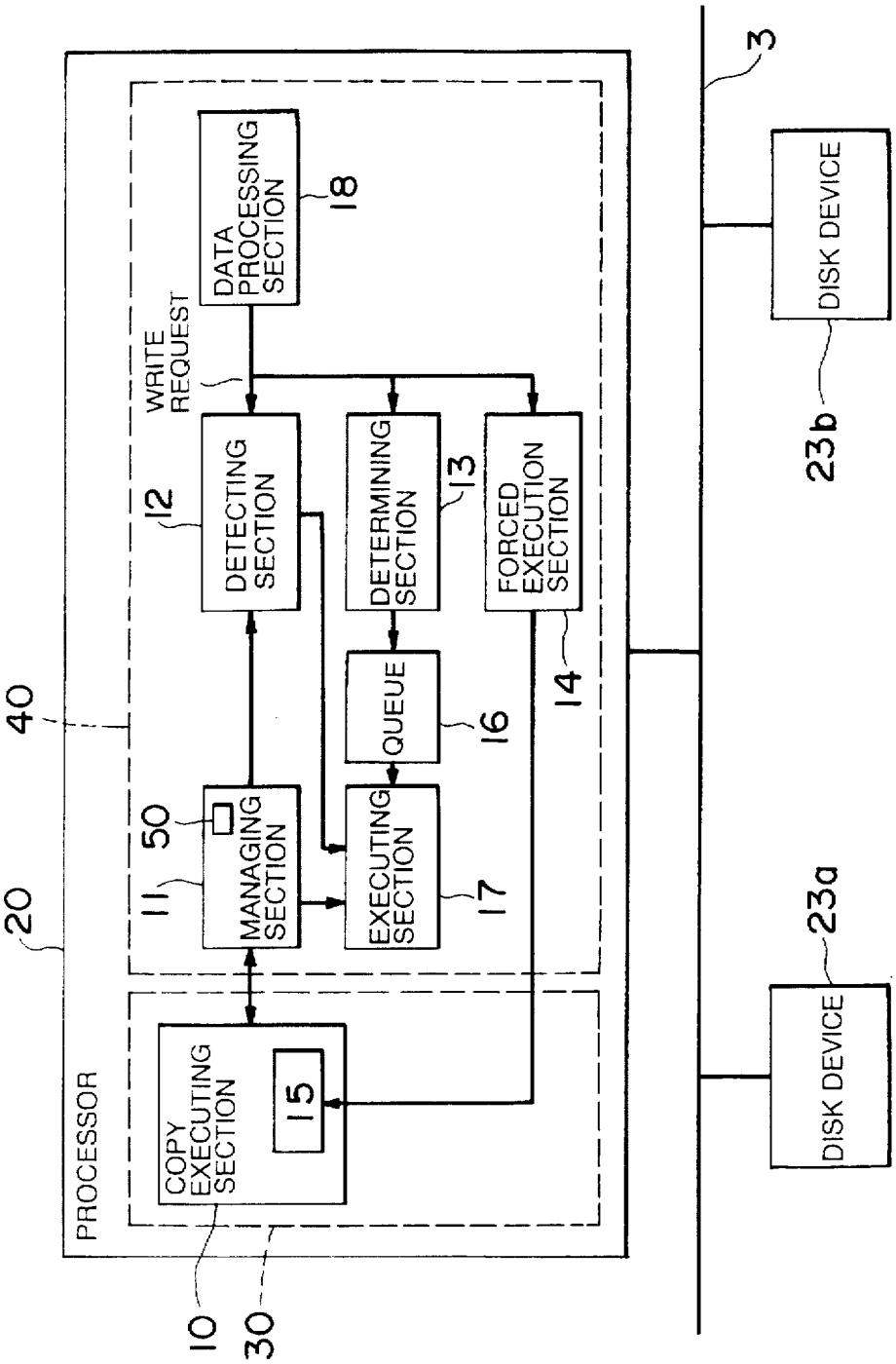
FIG. 2 is a block diagram illustrating an internal configuration of a processor shown in FIG. 1.

Next, an internal structure of the processor 20 for embodying the above architecture will be explained with reference to FIG. 2. This processor 20 comprises a data processing section 18 for issuing the write request, a copy executing section 10 inclusive of a re-executing section 15 and a managing section 11 for receiving an instruction from this copy executing section 10. The processor 20 also comprises a detecting section 12 for receiving data from this managing section 11 and the write request from the data processing executing section 18, a determining section 13 for receiving the write request transferred from this detecting section 12 and a forced execution section 14 for receiving the write request transferred from this determining section and, at the same time, giving an instruction to the re-executing section 15. The processor 20 further comprises a queue 16 for receiving the write request transferred from the determining section 13 and a write executing section 17 for receiving the data from the managing section 11 and the write request transferred from the detecting section 12 or the queue 16.

The data processing section 18 executes the data processing and issues, to the disk unit 23, a variety of write processing requests necessary in terms of executing this data processing.

The copy executing section 10 serving as a copy executing means sequentially determines the storage areas in the disk devices 23a; 23b in which the exclusive environment should be set. Meanwhile, the copy executing section 10 executes the copy processing between the disk devices 23a and 23b on the unit of storage area in which the exclusive environment is set in accordance with this determination. Specifically the copy executing section 10 determines that the exclusive environment should be set in some of the storage areas of the disk unit 23, and instructs the setting of the exclusive environment to the managing section 11. After the managing section 11 gives a response, saying that the setting of the exclusive environment has been completed, the copy executing section 10 executes the copy processing for the contents of the disk device with respect to the storage areas where the exclusive environment has been set. After, completing the copy processing with respect to a certain storage area, the copy executing section 10, when determines that the next storage area should be set in the exclusive environment.

Figure 5:
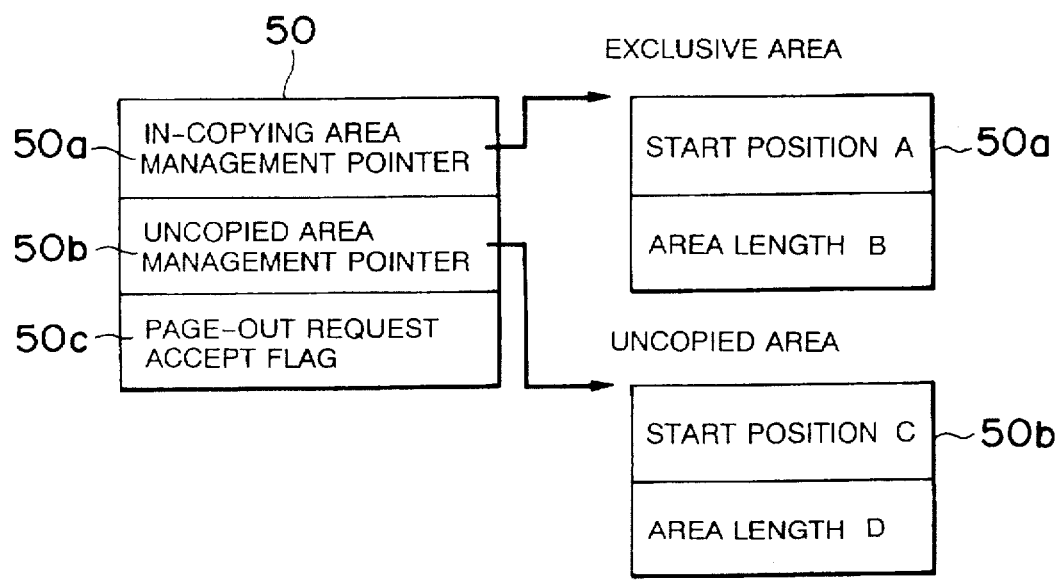
FIG. 5 an explanatory diagram of a dualizing management table in FIG. 2.

The managing section 11, receives from the copy executing section 10 the instruction that the exclusive environment should be set. It then sets the exclusive environment in the storage areas within the in-copying disk unit 23 and manages it. That is, the managing section 11 has a dualizing management table 50 shown in FIG. 5. This dualizing management table 50 is constructed of a in-copying area management pointer 50a for managing the in-copying area defined as an exclusive area, and an uncopied area management pointer 50b for managing an uncopied area. The dualizing management table 50 is also constructed of a page-out request accept flag management area 50c for indicating whether a page-out request (a write request exhibiting a high degree of importance) to the in-copying area was accepted or not. Note that the in-copying area management pointer 50a manages a start position (an address) A of the exclusive area and its area length B within the disk unit 23. Further, the uncopied area management pointer 50b manages a start position (the address) C, of the uncopied area, and its area length D within the disk unit 23. "Setting a certain storage area in the exclusive environment", implies that the start position of this storage area and the area length thereof are registered in the in-copying area management pointer 50a.

The detecting section 12 receives a notice of the data (i.e., the management data of the in-copying area management pointer 50a) for specifying the storage area which is now being copied from the managing section 11. Then, the detecting section 12 recognizes which storage area the write request, received from the data processing section 18, is given to. As a result, the detecting section 12 determines whether or not this write request is given to the now-in-copying storage area (the exclusive area). If the detecting section 12, determines that the write request is not for the now-in-copying area (the exclusive area), it transfers the write request to the executing section 17. On the other hand, if the detecting section 12, determines that the write request is for the now-in-copying area (the exclusive area), it transfers the write request to the determining section 13.

The determining section 13 determines the class of the write request. Specifically, whether or not the class of the write request is a class with high importance to the system transferred from this detecting section 12. This determination is performed by examining bits contained in the write request. If the determining section 13, determines that the write request is important to the system, it transfers the write request to the forced execution section 14. Whereas if the write request is not important to the system, the determining section 13 links this write request to the queue 16.

The forced execution section 14 serving as a forced execution means, write request transferred from the determining section 13, forcibly executes the irrespective of the setting of the exclusive environment.

When the forced execution section 14 has forcibly executed the write processing, the re-executing section 15, serving as a re-executing means, prompts the copy executing section 10 to re-execute the copying processing for the now-in-copying storage area from the beginning.

The queue 16, defined as a suspending means, arranges and links the write requests transferred from the determining section 13 in a receiving sequence. While being linked to this queue 16, the processing execution for this write request is suspended. Accordingly, the write processing execution corresponding to the write request which conflicts with the I/O write processing for copying is restricted in the now-in-copying area as the exclusive area.

The executing section 17 executes the processing in response to a write request having a lower degree of importance to the system. More specifically, the executing section 17, when receiving the write request transfered from the detecting section 12, immediately executes the processing, because this write request does not conflict with the copy processing. Further, the executing section 17 receives the data about the dualizing management table 50 from the managing section 11. The executing section 17 then detects a change of the exclusive area to be managed by the exclusive area management pointer 50a thereof. Subsequently, if the exclusive area is changed, the executing section 17 sequentially takes out the write requests linked to the queue 16, and executes the processing in response to the write request.

This processor 1 is, as a matter of fact, constructed of hardware, i.e., a CPU (Central Processing Unit) and a local memory. Then, the above-mentioned copy executing section 10, etc. is developed on processor 20 when the program is loaded on this local memory and when this loaded program is executed by the CPU. Concretely, the copy executing section 10 and the re-executing section 15 are developed based on a program termed a global service 30. Further, the managing section 11, the detecting section 12, the determining section 13, the forced execution section 14, the queue 16, the executing section 17 and the data processing section 18 are developed based on a program termed a local service.

Figure 3:
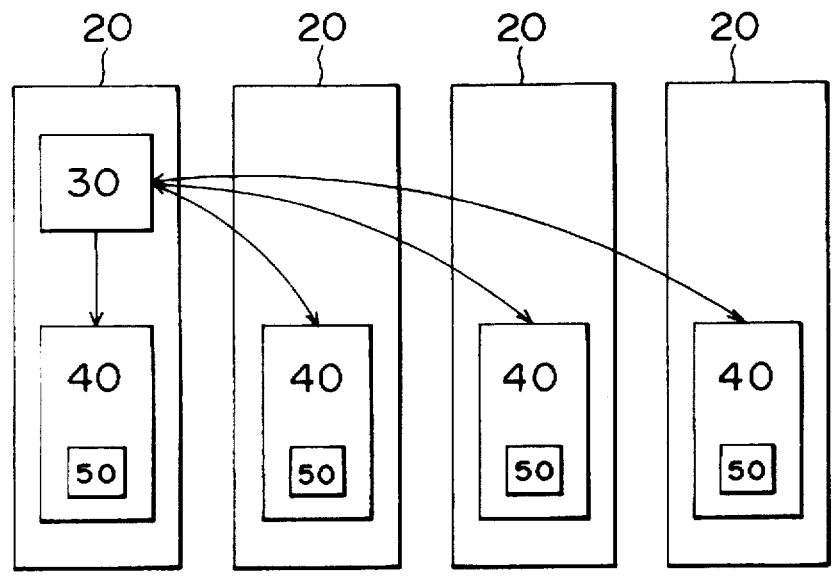
FIG. 3 a schematic diagram of assistance in explaining a relationship between respective functions executed on individual processors shown in FIG. 2.

In this embodiment, as illustrated in FIG. 1, the plurality of processors 20 are provided in the data processing system. Each processor 20 is capable of mutually independently executing the I/O processing for all the disk unit 23. It is desirable that each processor 20 recognizes a location of each of the in-copying areas in order to enhance the performance of the I/O processing. For this purpose, it is desirable that each processor 20 has a managing section 11, a data processing section 18, a executing section 17 and a forced execution section 14. It may, however, be sufficient that only one copy executing section 10 described above is incorporated into the data processing system. Hence, the present invention adopts the following architecture for an execution of the dualizing. As illustrated in FIG. 3; the global service 30 for effecting main processing of the dualizing is developed on a specified processor 20. At the same time, local services 40 for performing subprocessing of the dualizing and the I/O write processing are developed on all the processors 20.

Then, the copy executing section 10, developed on the specified processor 20, in accordance with the global service 30, makes a request for setting the exclusive area to the managing sections 11 developed by the respective local services 40 on all the processors 20. Further, this copy executing section 10 receives the data managed by the dualizing management tables 50 developed corresponding to those managing sections 11. Accordingly, the re-executing section 15, developed on the specified processor 20, by the global service 30, is capable of re-executing the copy processing from the beginning, when any one of the forced execution section 14 of the processors 20 forcibly executed the write request.

As can be understood from the discussion given above, the global service 30 is defined as only one service program existing on the specified processor 20 among the plurality of processors 20 within the same data processing system. On the other hand, the local service 40 is defined as a service program existing on each processor 20.

Figure 4:
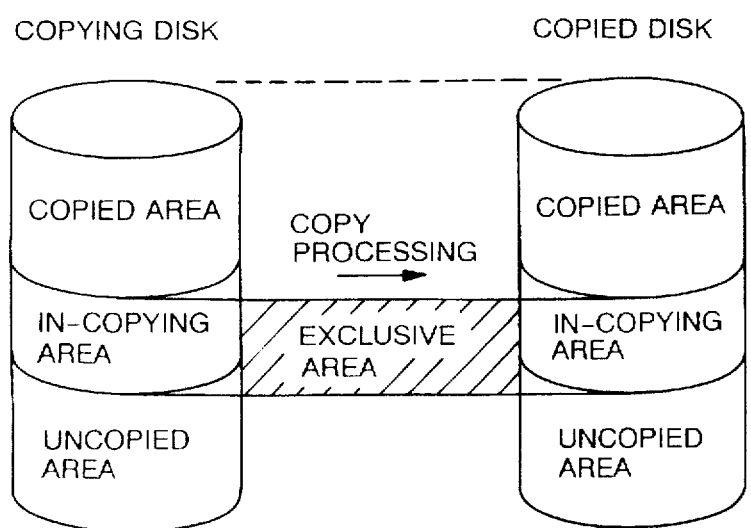
FIG. 4 is an explanatory diagram of copy processing.

Thus defined global service 30 requests each of the local services 40 to prepare the exclusive environment, and, at the same time, controls the local service 40 developed on the self-processor 20. Besides, the global service 30 executes the copy processing of the dual disk unit 23 as shown in FIG. 4.

On the other hand, thus defined local service 40 executes the preparation of the exclusive environment, which is requested by the global service 30. The local service 40 also executes access processing to the disk unit 23, which is requested by the self-processor 20.

Figure 6:
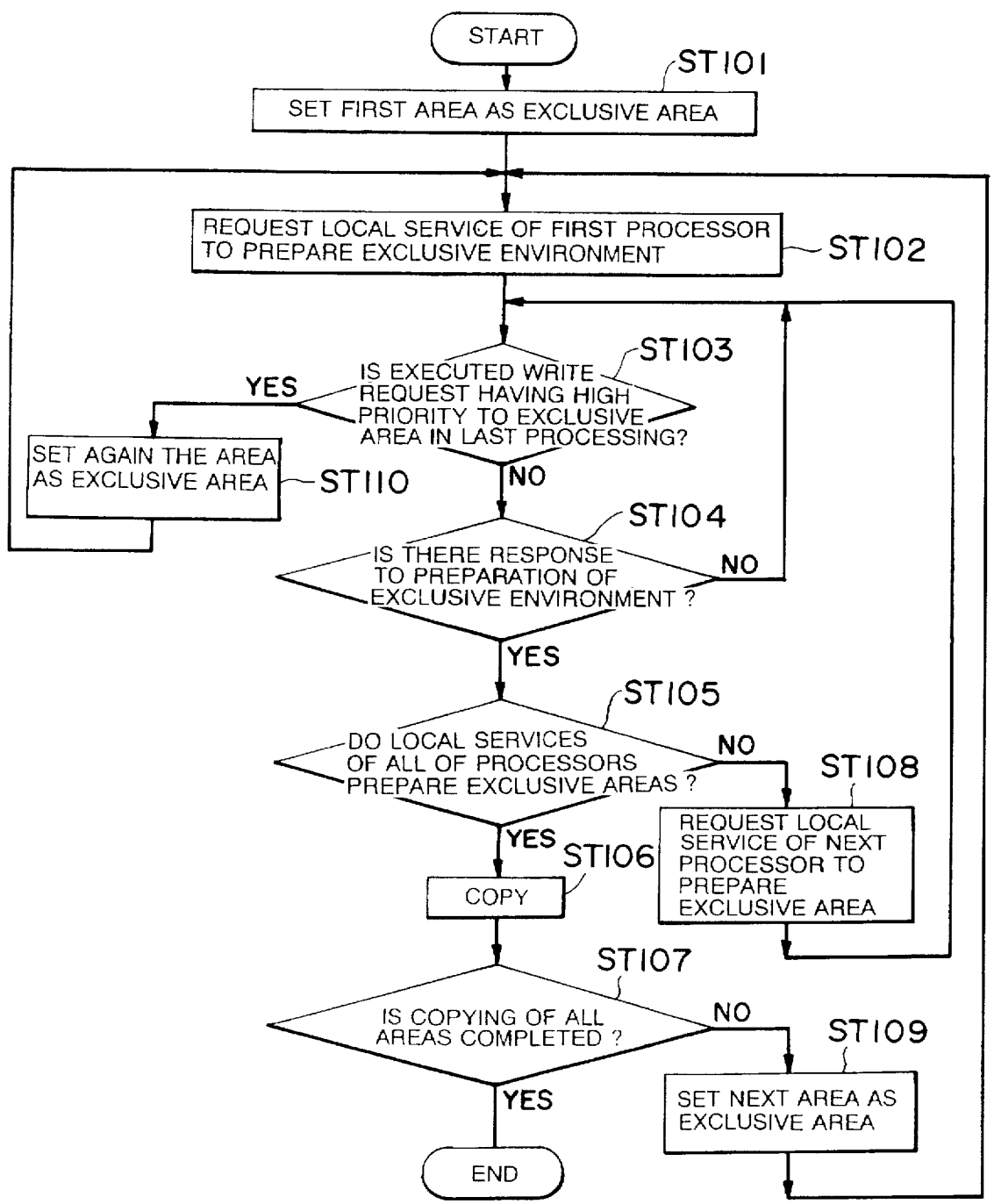
FIG. 6 is a flowchart showing the processing executed by a global service in FIG. 2.
Figure 7:
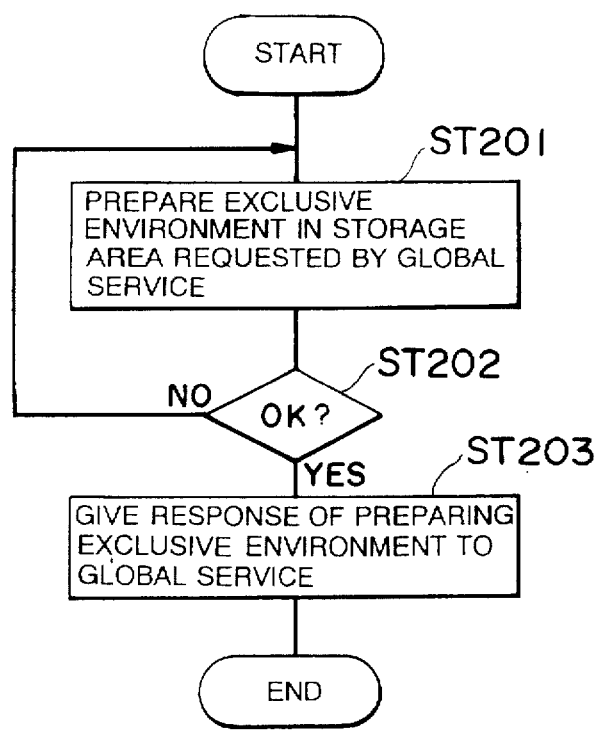
FIG. 7 is a flowchart showing exclusive environment preparation processing executed by a local service in FIG. 2.
Figure 8:
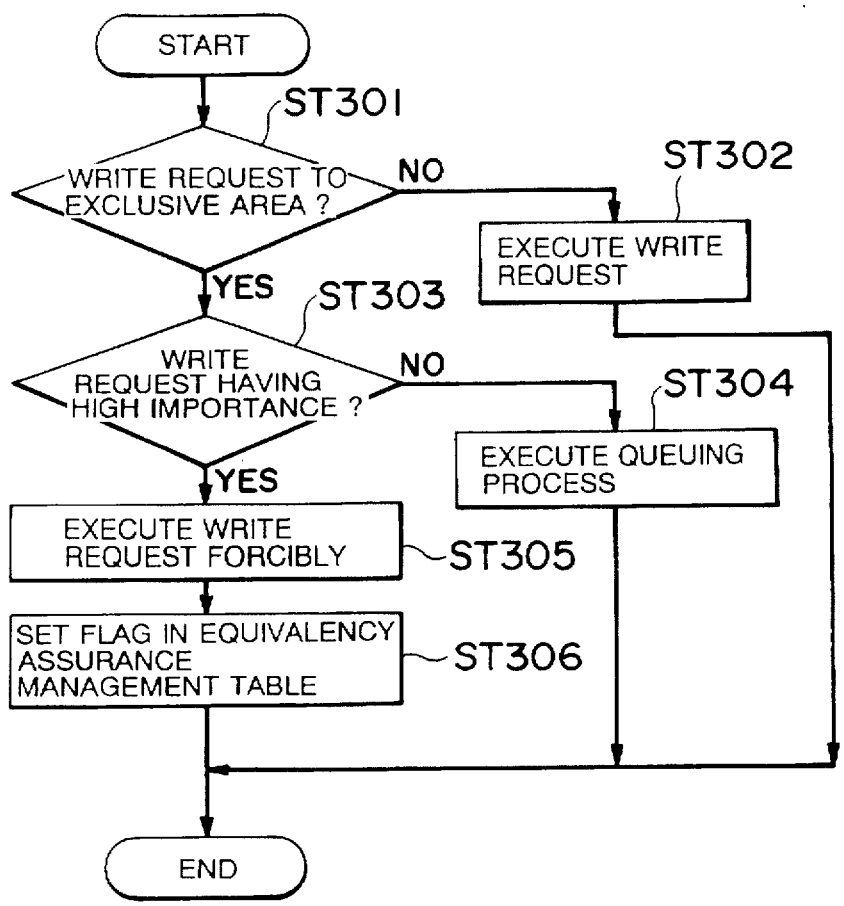
FIG. 8 is a flowchart showing the processing to a write request which is executed by the local service in FIG. 2.

FIG. 6 is a flowchart showing the processing executed by the global service 30. FIGS. 7 and 8 are flowcharts showing the processing executed by the respective local services 40. Next, the dualizing executed according to the present invention will be explained in greater detail in accordance with these processing flows.

To start with, the copy processing executed by the global service 30 will be explained with reference to the processing flow of FIG. 6.

The global service 30, when a request for executing the dualizing is issued based on the operation by the operator, starts the copy processing shown in the processing flow of FIG. 6. Then, in step ST101, the global service 30 determines that the first unit storage area among all of unit storage area into which the storage area of the disk unit 23 is subdiveded should be an exclusive area. After completion of the step ST101, the process exceeds the copy processing of step ST102 through step ST106. In step ST102, the global service 30 requests the local service 40 of the first processor 20 to prepare the exclusive environment in this area. That is, as illustrated in FIG. 4, the global service 30 requests the local service 40 to prepare the exclusive environment so that the exclusive area is to be set in some of the storage areas of the disk unit 23.

The local service 40 requested to prepare the exclusive area starts the processing shown in the processing flow of FIG. 7. The local service 40 then sets the exclusive area in the storage area requested by the global service 30 (step ST201). Subsequently, when completing the preparation of the exclusive environment (step ST202), the local service 40 gives a response of the preparation of the exclusive environment to the global service 30 (step ST203). Note that this preparation response is made by registering a result of the setting in a pointer (an in-copying area management pointer 50a and uncopied area management pointer 50b) of the dualizing management table 50.

Referring back to FIG. 6, the global service 30, after making the request for preparing the exclusive area, repeatedly checks whether or not there is executed the write request having a higher priority with respect to the storage area in which the exclusive environment preparation request of the last copy processing has been made (step ST103). The global service 30 also repeatedly checks whether or not there is given a response of the preparation of exclusive environment in the storage area requested in the step ST102 (step ST103). These checking processes are carried out by looking into the pointer (the in-copying area management pointer 50a) and the page-out request accept flag 50c of the dualizing management table 50 of the local service 40 requested to prepare the exclusive environment.

When determining that there is the response of the preparation of the exclusive environment in step ST104, the global service 30, in next step ST105, checks whether or not the local services 40 of all the processors 20 have prepared the exclusive environments in the storage areas to be processed in this time. When determining that the local services 40 of all the processors 20 do not yet prepare the exclusive environments, the global service 30, in step ST108, makes the same request for preparing the exclusive environment as that in step ST102. Then, the global service 30 shifts the processing back to steps ST103 and ST104 and checks the local service 40 of this processor 20.

When it is determined that the all the processors have prepared the exclusive environment in this area as a result of performing the processing of steps ST102 through ST105 and ST108, the global service 30 proceeds the processing from step ST105 to step ST106. In this step ST106, the global service 30 executes the copy with respect to the storage area (the exclusive area) to be processed this time. That is, the global service 30 copies the contents of the non-exchange disk devices 23a or 23b in the exclusive areas of the newly installed disk devices 23a or 23b.

Next, the global service 30, in step ST107, determines whether or not the copying of all the storage areas on the disk unit 23 has been completed. Then, the global service 30, when determining that the copying of all the storage areas has been completed, finishes the processing. On the other hand, the global service 30, when determining that the copying of all the storage areas is not completed, proceeds the processing to step ST109. In this step ST109, the global service 30 decides that the next areas on the disk units 23 is set as exclusive areas. The global service 30 then returns the processing to step ST102. Accordingly, it follows that the request for preparing the exclusive environment in the next area is made starting from the local service 40 of the first processor 20 (ST102).

On the other hand, the global service 30 proceeds the processing to step ST110, if it determines in step ST103 that the processor 20 has just been executed the write processing in the the exclusive area. In step ST110, the global service 30 resets the page-out request accept flag 50c, within the dualizing management table 50, of the local service 40 that has executed the write processing. Thereafter, the global service 30 sets the storage area which was an object of the last copy processing as the exclusive area once again, and returns the processing to step ST102. Accordingly, it follows that the request for preparing the exclusive environment in the same area as processed in last time is performed over again starting from the local service 40 of the first processor 20.

In this way, the global service 30, when the local service 40 of any one of the processors 20 forcibly executes the write request to the exclusive area, executes the copy processing once more with respect to the same exclusive area.

Given next in accordance with the processing flow of FIG. 8 is an explanation about the processing in which each local service 40 sets the page-out request accept flag 50c in the dualizing management table 50. This processing of FIG. 8 starts with issuing the write requests to the dual disk unit 23 from the data processing section 18. It is noted that even when each local service 40 is in the middle of executing the processing of FIG. 7, and when the write request occurs, the processing of FIG. 8 is to be executed by interruption. In this case, the processing of FIG. 6 is stopped till the processing of FIG. 8 is finished.

In the processing of FIG. 8, the local service 40, first in step ST301, determines whether or not the write request occurred is a write request to the exclusive area. That is, as stated earlier, the local service 40 sets the exclusive area for the dualizing in accordance with an instruction of the global service 30. The local service 40 then registers a result of this setting in the in-copying area management pointer 50a of the dualizing management table 50 (see step ST203). Hence, the local service 40 is, when the write request occurs, capable of determining whether or not the write request is the write request to the exclusive area by referring to the data registered in the in-copying area management pointer 50a of the dualizing management table 50.

In this step ST301, when determining that the write request issued is not the write request to the exclusive area, the local service 40 proceeds the processing to step ST302. In this step ST302, the local service 40 executes the write processing responding to the issued write request and thereafter finishes the processing. That is, the write request issued is the write request to the storage area other than the storage area subjected to the execution of the dualizing (the exclusive area), and, therefore, the local service 40 directly executes the write request.

On the other hand, when determining that the issued write request is the write request to the exclusive area in step ST301, the processing proceeds to step ST303. In this step ST303, the local service 40 determines whether or not the issued write request is a write request having a high priority. When the local service 40 determines that the write request has a low priority, processing proceeds to step ST304. In this ST304, the local service 40 performs queuing of the issued write request in the queue 16. More specifically, the local service 40 queues this write request in the queue 16 in order to execute this write request after canceling the setting of the exclusive environment with respect to the storage area as a target of this write request. Thereafter, the processing comes to an end.

On the other hand, when determining that the issued write request is the write request having the high priority in step ST303, the local service 40 proceeds the processing to step ST305. In this step ST305, the local service 40 forcibly executes the write processing to the write request received. Then, the local service 40, in step ST306 subsequent thereto, sets a flag showing this effect and thereafter finishes the processing. That is, even when the issued write request is the request to the storage area (the exclusive area) as a target of the execution of the dualizing, and if this write request has a high degree of importance, the local service 40 executes the corresponding write processing without any wait of the write request. Then, the local service 40 registers the fact of executing the write request in the dualizing management table 50.

In this manner, the local service 40 forcibly executes the corresponding write request without the wait of the write request even when the write request is issued to the in-copying exclusive area during the execution of the dualizing of the disk unit 23, and if the write request has the high degree of importance.

Note that in the processor 20 where the global service 30 is executed, the local service 40 is also simultaneously executed. This simultaneous execution can be attained by such a method that the two programs 30 and 40 are virtually processed in parallel.

Figure 9:
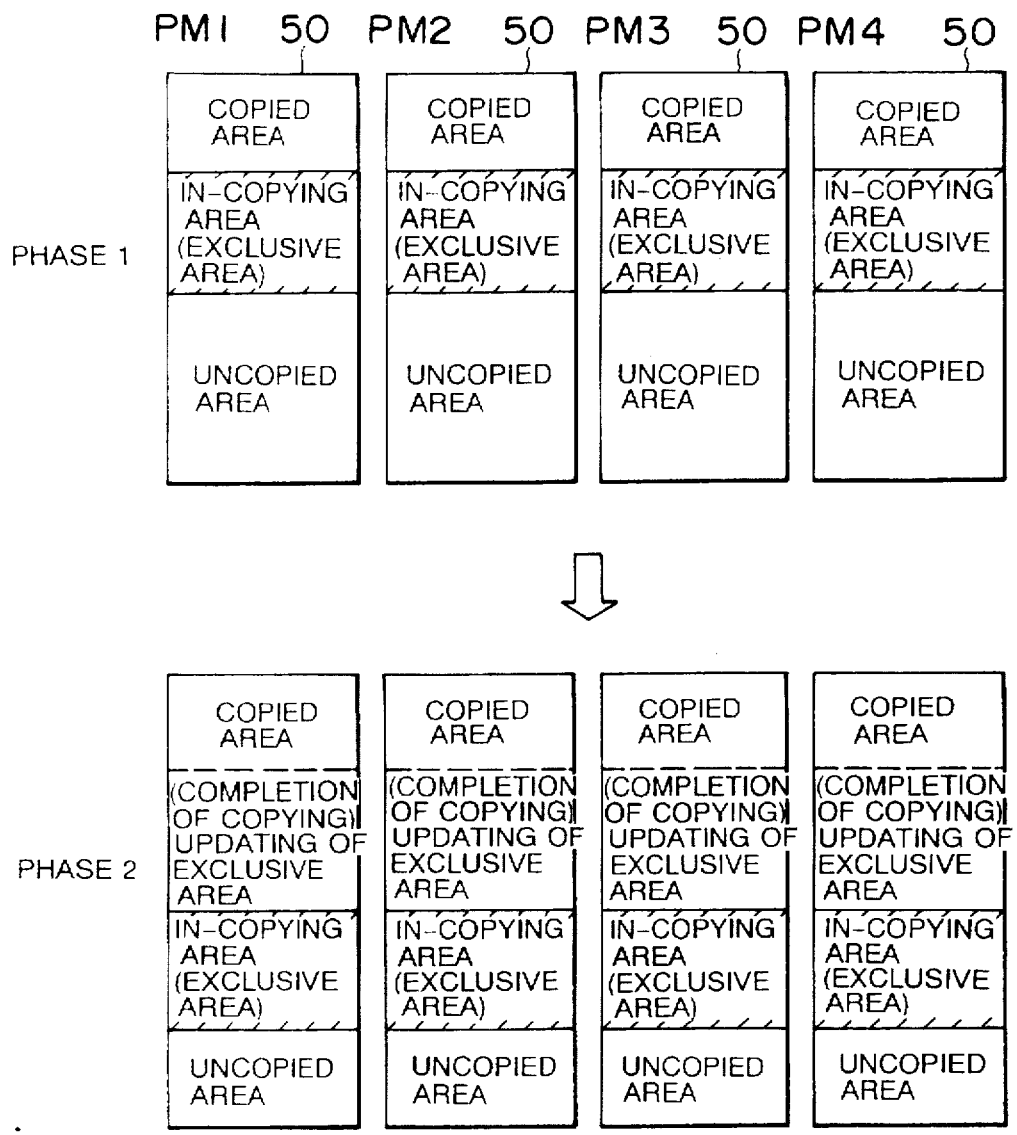
FIG. 9 is an explanatory diagram showing a flow of processing when in a normal state in the embodiment of this invention.

Procedures of the dualizing in this embodiment will be explained with reference to specific examples shown in FIGS. 9 and 10. First, if a trouble happens in any one of the couple of dual disk devices 23a and 23b, the operator disconnects the disk device 23b where this trouble happens from the bus 3 and replaces it with a new disk device 23b. Corresponding to this, the copy executing section 10 registers a data for identifying a storage area within the disk device 23a in the managing section 11 of each processor 20. The copy executing section 10, after this registration, copies, contents written in the storage areas (the exclusive areas and the in-copying areas) of the disk device 23a that are indicated by the registered identification data in the corresponding storage area of the disk device 23b (phase 1 in FIG. 9). The copy executing section 10, when completing the copying, registers a data for identifying other storage area within the disk device 23a in the managing section 11 of each processor 20. The copy executing section 10 shifts the storage areas (the exclusive areas and the in-copying areas) as targets for copying (phase 2 in FIG. 9). The copy executing section 10 repeats the above processing till uncopied areas disappear in the disk devices 23a and 23b. More specifically, the copy executing section 10 subdivides the storage area of the disk device 23a, in which no trouble happens. The copy executing section 10 sequentially registers the data indicating which storage area is in the copying process among the subdivided storage areas in the managing section 11 of each processor 20. Subsequently, the copy executing section 10 sequentially copies the contents written in the registered storage areas on a newly installed disk device 23b.

If the write request to the disk device 23a is issued from the data processing section 18, in the middle of executing the copy processing between the disk devices 23a and 23b (see phase 2 in FIG. 10), the detecting section 12 detects whether or not this write request is a write request to the in-copying storage area by referring to the data managed by the dualizing management table 50 of the managing section 11. If detects that the write request is a write request to the in-copying storage area, the determining section 13 determines whether or not the write request is a predetermined specified I/O write processing. This specified I/O write processing is I/O write processing having the high degree of importance to the system. For example one for paging.

If the determining section 13 determines that the write request is not for the specified I/O processing, it links this write request to the queue 15. The write request linked to the queue 15 is not transferred to the executing section 16 unless the object for registration by the managing section 11 is changed to the identification data of the next storage area after completing the copy processing with respect to the storage area registered in the managing section 11. As described above, the write request to the in-copying storage area is in principle suspended.

If the determining section 13 determines that the write request is for the specified I/O processing, it transfers the write request to the forced execution section 14. The forced execution section 14 forcibly executes this write request irrespective of the exclusive environment set by the copy executing section 10. Phase 2, in FIG. 10, is based on the assumption that the write request having the high degree of importance is issued and executed by the processor 20, expressed by PM3. Concomitantly with this, the re-executing section 15 in the copy executing section 10 immediately rolls back the copying areas just when referring to the dualizing management table 50 possessed by PM3 and re-executes the copy processing (see phase 3 in FIG. 10).

As discussed above, the disk copying apparatus in this embodiment takes the following architecture. When the write request having the high degree of importance to the system is issued for the exclusive area for the dualizing, the copying is executed without any wait of this write request. Thereafter, the copying of the same exclusive area is executed once again. The disk copying apparatus in this embodiment adopts the above architecture and thereby assures the equivalency of the dual disk unit 2. According to this architecture, the special file such as a paging file can be developed on the dual disk unit 2 without inducing a drop in terms of data processing efficiency.

The illustrative embodiments have been discussed by way of the preferred embodiments. The present invention is not, however, confined to these embodiments. For instance, the embodiment discloses the architecture in which the write request having the high degree of importance is forcibly executed. The present invention may take the following method. For example, when there is a write request for effecting page-out on the disk unit, and when this write request indicates the page-out with respect to the data necessary for continuation of the dualizing, the execution responsive to the specified write request is forcibly performed.

As discussed above, according to the present invention, the following architecture is taken. When the write request having the high degree of importance to the system is issued for the exclusive area with the assurance of the equivalency, the copying is executed without any wait of that write request. Thereafter, the copying of the same exclusive area is executed once again, thereby assuring the equivalency of the dual disk unit. Based on this architecture, the special file such as the paging file or the like can be developed on the dual disk unit without inducing the decrease in the data processing efficiency.

This invention being thus described, it will be obvious that the same may be varied in same ways. Such variations are not to be regarded as a departure from the spirit and scope of the invention, and all such modifications as would be obvious to one skilled in the art are intended to be included within the scope of the following claims.

What is claimed is:

1. A disk copying apparatus in a data processing system for performing write processing to a plurality of disk devices for storing data, comprising:

copy executing means for executing copy processing to copy the data stored in one of said disk devices to another of said disk devices;

determining means for determining, when a write request occurs during said copy processing, whether said write request requests write processing for page-out with respect to data necessary for continuation of said copy processing;

forced execution means for forcibly executing the write processing corresponding to the write request when said determining means determines that the write request requests write processing for page-out with respect to data necessary for continuation of said copy processing;

re-executing means for causing said copy executing means to re-execute said copy processing when said forced execution means forcibly executes the write process; and suspending means for suspending the execution of said write process until said copy processing by said copy executing means is finished, when said determining means determines that the write request does not make a write request for page-out with respect to data necessary for continuation of said copy processing until the copy processing by said copy executing means is finished;

wherein disk copying is interrupted when said write request is for page-out, and disk copying is not interrupted when said write request is not for page-out, whereby use of the data processing system is not interrupted when said write requests are for page-out 2. A disk copying apparatus according to claim 1, further comprising managing means for managing an area among all areas of each disk drive, as an exclusive area where the copy processing is performed by said copy executing means, wherein requests for write processing to the exclusive area are suspended by said suspending means.

3. A disk copying apparatus according to claim 1, wherein said data processing system includes a plurality of processors, each functioning individually, one specific processor among said plurality of processors having said copy executing means and said re-executing means, all of said plurality of processors having said determining means and said forced execution means, and wherein said re-executing means causes said copy executing means to perform the copy processing over again when one of said forced execution means included in each of said processors has forcibly executed the write processing.

4. A disk copying apparatus according to claim 2, wherein said suspending means includes a queue to which the suspended write request is linked.

5. A disk copying apparatus according to claim 4, wherein write processing is executed, in response to a write request linked to said queue, after completing the copy processing by copy executing means.

6. A disk copying apparatus according to claim 2, wherein said copy executing means specifies only some of the storage areas of said disk device as being exclusive areas, and copies data stored in the specified exclusive storage areas, and wherein said managing means manages the specified storage areas as the exclusive areas.

7. A disk copying apparatus according to claim 6, wherein said managing means has a management table for indicating a position of the exclusive area within the storage device.

8. A disk copying apparatus according to claim 6, further comprising detecting means for detecting whether or not a write request has been issued for the exclusive area managed by said managing means, said detecting means causing only when the write request is issued for the exclusive area, said determining means to determine whether or not the write request is a write request with respect to data necessary for continuation of copy processing, and wherein said determining means gives an indication to execute the write processing corresponding to the write request, with no determination made by said determining means, when the write request is not for the exclusive area.

9. A disk copying apparatus according to claim 6, wherein said data processing system includes a plurality of processors each functioning individually, one specific processor among said plurality of processors having said copy executing means and said re-executing means, all of said plurality of processors having said managing means, said determining means and said forced execution means, wherein said copy executing mens notifies said managing means included in each of said processors of a location of the exclusive area, and wherein said re-executing means causes said copy executing means to perform the copy processing over again when one of said forced execution means included in each of said processors has forcibly executed the write processing.

10. A disk copying apparatus according to claim 7, wherein said management table contains an item of data showing whether or not write processing has been forcibly executed to the exclusive area by said forced execution means, and wherein said re-executing means recognizes whether or not said forced execution means has forcibly executed the write processing based on the item of data contained in said management table.

11. A disk copy processing method of copying data stored in a first disk device on a second disk device in a data processing system, said method comprising:

a step of determining an exclusive area of said first and second disk devices in which the copying is effected;

a step of determining, when a write request occurs for one of said exclusive areas, whether said write request requests write processing for page-out with respect to data necessary for continuation of the copying;

a step of forcibly executing the write processing corresponding to data necessary for continuation of the copying to said exclusive area, and thereafter repeating said step of determining an exclusive area, and a step of executing write processing other than with respect to data necessary for continuation of the copying device, after completing the copying, whereby disk device copying is interrupted when said write request is for page-out so that use of the data processing system is not interrupted when said write requests are for page-out.

12. A disk copying apparatus in a data processing system having a dual disk architecture in which an exclusive in-copying area is set for copying data of one disk onto a second disk, said apparatus comprising:

managing means for managing the exclusive in-copying storage areas of said dual disks using dualized management tables;

detecting means for detecting whether said write request is issued for the exclusive in-copying storage area managed by said managing means;

determining means for determining, when said detecting means detects the issuance of the write request, whether or not this write request requests write processing for page-out with respect to data necessary for continuation of the copying;

forced execution means for forcibly executing the write processing with respect to said exclusive in-copying area when said determining means determines that the write request makes requests write processing for page-out with respect to data necessary for continuation of the copying; and is re-executing means for re-executing the copying of data of the exclusive in-copying storage area managed by said managing means when said forced execution means forcibly executes the write processing.

13. A disk copying apparatus according to claim 12, wherein said data processing system includes a plurality of processors, each of said processors including said managing means, said detecting means and said forced execution means, one of said plurality of processors further including said re-executing means for re-executing copying the data when one of said forced execution mean s forcibly executes the write processing.

14. A disk copying apparatus according to claim 12, wherein said determining means determines a processing having a high degree of importance as specified processing.

15. A disk copying apparatus according to claim 12, wherein said data processing system takes such an architecture that a paging file is developed on dual disks, and wherein said determining means determines whether a write processing request requests the paging file having data necessary for the copy processing.

16. A disk copying apparatus according to claim 13 wherein said determining means determines a processing having a high degree of importance as specified processing.

17. A disk copying apparatus according to claim 13, wherein said data processing system takes such an architecture that a paging file is developed on dual disks, and wherein said determining means determines whether a write processing request requests the paging file having data necessary for the copy processing.

* * * * *

UNITED STATES PATENT AND TRADEMARK OFFICE
CERTIFICATE OF CORRECTION

PATENT NO. : 5,761,704
DATED : June 2, 1998
INVENTOR(S) : Takamasa Sasaki

It is certified that error appears in the above-identified patent and that said Letters Patent is hereby corrected as shown below:

Column 1, line 19, delete "systems" and insert --system-- therefor

Column 1, line 39, delete "identical" and insert --made identical-- therefor

Column 3, line 47, delete "again" and insert --again,-- therefor

Column 3, line 65, after "3" insert --is--

Column 4, line 2, after "5" insert --is--

Column 4, line 50, delete "non-exchange" and insert --non.-- therefor

UNITED STATES PATENT AND TRADEMARK OFFICE
CERTIFICATE OF CORRECTION

PATENT NO. : 5,761,704
DATED : June 2, 1998
INVENTOR(S) : Takamasa Sasaki

It is certified that error appears in the above-identified patent and that said Letters Patent is hereby corrected as shown below:

Column 5, line 32, delete "23a;" and insert --23a,-- therefor

Column 5, line 37, delete "Specifically" and insert --Specifically,-- therefor

Column 5, line 47, delete "when"

Column 6, line 47, delete "copying" and insert --copying,-- therefor

Column 7, line 14, delete "recognizes" and insert --recognize-- therefor

Column 8, line 7, delete "subdiveded" and insert --subdivided-- therefor

UNITED STATES PATENT AND TRADEMARK OFFICE
CERTIFICATE OF CORRECTION

PATENT NO. : 5,761,704
DATED : June 2, 1998
INVENTOR(S) : Takamasa Sasaki It is certified that error appears in the above-identified patent and that said Letters Patent is hereby corrected as shown below:

Column 8, line 17, delete "area" and insert

--area,-- therefor

Column 9, line 17, delete "40" and insert

--40,-- therefor

Column 10, line 1, delete "this"

Column 11, line 8, delete "detects" and insert --it detects-- therefor

Column 11, line 13, delete "example" and insert --example,-- therefor

Column 12, line 41, delete "finished;" and insert --finished,-- therefor

UNITED STATES PATENT AND TRADEMARK OFFICE
CERTIFICATE OF CORRECTION

PATENT NO. : 5,761,704
DATED : June 2, 1998
INVENTOR(S) : Takamasa Sasaki

It is certified that error appears in the above-identified patent and that said Letters Patent is hereby corrected as shown below:

Column 12, line 46, delete "out" and insert --out.-- therefor

Column 14, line 32, delete "is"

Column 13, line 18, delete "causing" and insert --causing,-- therefor

Column 13, line 30, delete "processors" and insert --processors,-- therefor

Column 13, line 35, delete "mens" and insert --means-- therefor

Column 14, line 42, delete "mean s" and insert --means-- therefor

Signed and Sealed this

Twenty-ninth Day of September, 1998

Attest:

BRUCE LEHMAN

*Attesting Officer*    Commissioner of Patents and Trademarks